United States Patent [19]

Hennells

[11] Patent Number: 4,664,362

[45] Date of Patent: May 12, 1987

[54] GAS SPRING

[75] Inventor: Ransom J. Hennells, Plymouth, Mich.

[73] Assignee: Rantom, Inc., Canton, Mich.

[21] Appl. No.: 664,810

[22] Filed: Oct. 25, 1984

[51] Int. Cl.$^4$ .............................................. F16F 9/02
[52] U.S. Cl. ...................................... 267/119; 92/168; 188/322.17; 277/125; 277/205; 277/DIG. 6
[58] Field of Search .................... 188/322.16, 322.17; 267/64.15, 118, 119, 129, 130, 64.11; 277/123, 125, 205, DIG. 6; 92/168, 170; 308/DIG. 8; 74/18.2

[56] References Cited

U.S. PATENT DOCUMENTS

| | | | |
|---|---|---|---|
| 1,950,995 | 3/1934 | Piccard | 267/64.15 |
| 2,765,877 | 10/1956 | Carbon | 188/322.17 |
| 2,942,582 | 6/1960 | Dempster et al. | 92/168 |
| 3,101,194 | 8/1963 | Hennells, Sr. | 267/119 |
| 3,155,439 | 11/1964 | Guzewicz | 308/DIG. 8 |
| 3,167,323 | 1/1965 | Appleton et al. | 277/205 |
| 3,518,920 | 7/1970 | Bimba | 92/168 |
| 3,938,868 | 2/1976 | VanWyk | 308/DIG. 8 |
| 4,053,166 | 10/1977 | Domkowski | 277/205 |
| 4,085,661 | 4/1978 | Schriever | 92/168 |
| 4,337,692 | 7/1982 | Sifri et al. | 92/168 |
| 4,342,448 | 8/1982 | Wallis | 188/322.17 |
| 4,529,181 | 7/1985 | Wallis | 267/119 |

Primary Examiner—Duane A. Reger
Assistant Examiner—Alvin Oberley
Attorney, Agent, or Firm—Flynn, Thiel, Boutell & Tanis

[57] ABSTRACT

A gas spring unit with an improved packing structure for providing a lubricated guide and seal with the piston rod for containing a high-pressure gas while enabling the spring unit to function for a large number of operational cycles. The packing structure includes a pair of lubricating-type bushings disposed for slidable engagement with the piston rod, which bushings are axially spaced and confine a seal ring therebetween, the latter preferably being of polyurethane. The bushings are preferably impregnated with a lubricant such as graphite. The innermost bushing abuts against a shoulder on the housing to avoid imposition of excessive compressive forces on the seal ring.

9 Claims, 2 Drawing Figures

GAS SPRING

FIELD OF THE INVENTION

This invention relates to a gas compression spring and, in particular, to a spring having an improved packing associated with the slidable piston rod for permitting the spring to operate for a large number of cycles, such as at least 1,000,000 cycles, while utilizing relatively high internal pressures, such as at least 2,000 psi.

BACKGROUND OF THE INVENTION

Gas springs are utilized in many different types of equipment for absorbing and cushioning forces. These gas springs have been extensively utilized in the automobile industry in association with presses to cushion the large pressing forces. Such springs, one example of which is illustrated in U.S. Pat. No. 3,101,194 (W. E. Hennells, Sr.), have typically utilized rather low pressure to permit the spring to perform a large number of working cycles. This low internal pressure has required the use of larger cross-sectional areas, and the use of a substantial number of air springs disposed in parallel relationship, in order to effectively cushion large pressing forces. Use of such gas springs is hence often more complex than desired, and in some instances such usage is impossible due to space or other operational limitations.

Because of the desired performance which can be achieved by gas springs, specifically on presses, numerous attempts have been made to increase the internal pressure of the gas spring so as to substantially increase the force-cushioning capacity and/or reduce the overall spring size. Thus, numerous manufacturers have attempted to provide a gas spring having a normal internal gas pressure in the range of 2,000 to 3,000 psi. However, most of these springs have proven wholly unsuccessful since the springs have been observed to rapidly permit leakage of the pressurized gas past the stuffing box associated with the piston rod, and hence the spring fails after a relatively small number of operational cycles.

In an attempt to provide a high-pressure gas spring which would permit successful operation over a larger number of cycles, such as at least 1,000,000 cycles, Applicant has extensively studied the performance of gas springs, and specifically the typical failure point, namely the packing between the housing and the piston rod. It has been observed that, when the spring pressure exceeds about 1,500 psi, the rubber sealing ring as typically associated with the packing undergoes rapid failure since sealing rings constructed of rubber and similar products are unable to successfully perform a large number of cyclic operations under pressure levels in excess of about 1,500 psi. Such rubber sealing rings have been observed to rapidly wear and deteriorate when operated under high pressures, apparently due to the gas permeating the porosity of the rubber and becoming temporarily trapped therein.

It has also been observed that the typical stuffing box bushings as provided between the housing and piston rod perform unsatisfactorily. It is common to utilize bronze bushings for slidably supporting the piston rod. However, this bushing is unable to provide sufficient lubrication between the elastomeric sealing ring and the piston rod, and hence the sealing ring wears rapidly due to lack of lubrication.

Experimental evaluation of high-pressure gas springs employing packings formed by bronze bushings and conventional rubber or elastomeric sealing rings has indicated the inability of such gas springs to successfully operate for a large number of cycles due primarily to excessive wear of the sealing ring.

In apparent recognition of the failure of the packing structure, there has been developed one high-pressure gas spring which appears to have the capability of operating for a large number of cycles. This spring, known as the "Kaller" spring and manufactured by Stroemsholmens Mekaniska Verkstad AB, uses an internal gas (nitrogen) maintained at a relatively high pressure while allegedly permitting a large number of operational cycles. In this Kaller spring, there is provided a special overpressure seal associated with the packing, which seal has a higher pressure than the nitrogen pressure so as to prevent gas leakage from the unit. This special packing involves a pair of opposed portions defining thereon lips for slidably engaging the piston rod, which packing is axially compressed by the nitrogen within the unit through a piston arrangement which magnifies the pressure so that the packing ring has a higher pressure imposed thereon in an attempt to create a long-wearing sliding seal with the piston rod. The overall arrangement of this Kaller spring, however, and specifically the packing structure therefor, is complex and is believed less dependable than desired.

This invention relates to a gas spring which incorporates an improved packing structure capable of providing a lubricated guide and seal for slidable engagement with the piston rod so as to permit the gas spring to contain therein a high-pressure gas while at the same time enabling the spring unit to successfully function for a large number of operational cycles. The packing structure includes a pair of lubricating-type bushings disposed for slidable engagement with the piston rod, which bushings are axially spaced and confine a seal ring therebetween, the latter preferably being of polyurethane. The bushings are preferably impregnated with a lubricant such as graphite to effect lubrication of not only the bushings, but also of the slidable contact area between the piston rod and seal ring to minimize wear and hence enable the unit to operate for a large number of cycles. The sealing ring, by being constructed of a stiff material such as urethane, can withstand exposure to the high-pressure gas within the unit and still successfully operate for a large number of cycles. The innermost bushing preferably abuts against a shoulder on the housing, and not against the seal ring, to avoid imposition thereon of excessive compressive forces, whereby the seal ring remains in its desired configuration so as to effectively sealingly engage the piston rod.

It is thus an object of this invention to provide an improved gas spring which employs a packing ring capable of operating with a high-pressure gas, such as in the order of 2,000 to 3,000 psi, and capable of operating for a large number of cycles, such as 1,000,000 cycles.

A further object is to provide an improved gas spring, as aforesaid, which utilizes a packing structure which is of substantial simplicity, such as by employing a pair of bushings which are axially spaced and have a seal ring therebetween, whereby the packing structure is relatively economical to manufacture and assemble.

A further object is to provide an improved gas spring, as aforesaid, which is capable of absorbing or cushioning large external forces while at the same time enabling the spring unit to be of minimal size and complexity, which spring unit can be either self-contained or connected through conduits to a surge tank containing pressurized gas so as to positively maintain a constant base pressure within the spring unit.

Other objects and purposes of the invention will be apparent to persons familiar with structures of this general type upon reading the following specification and inspecting the accompanying drawings.

Figures 1, 2:
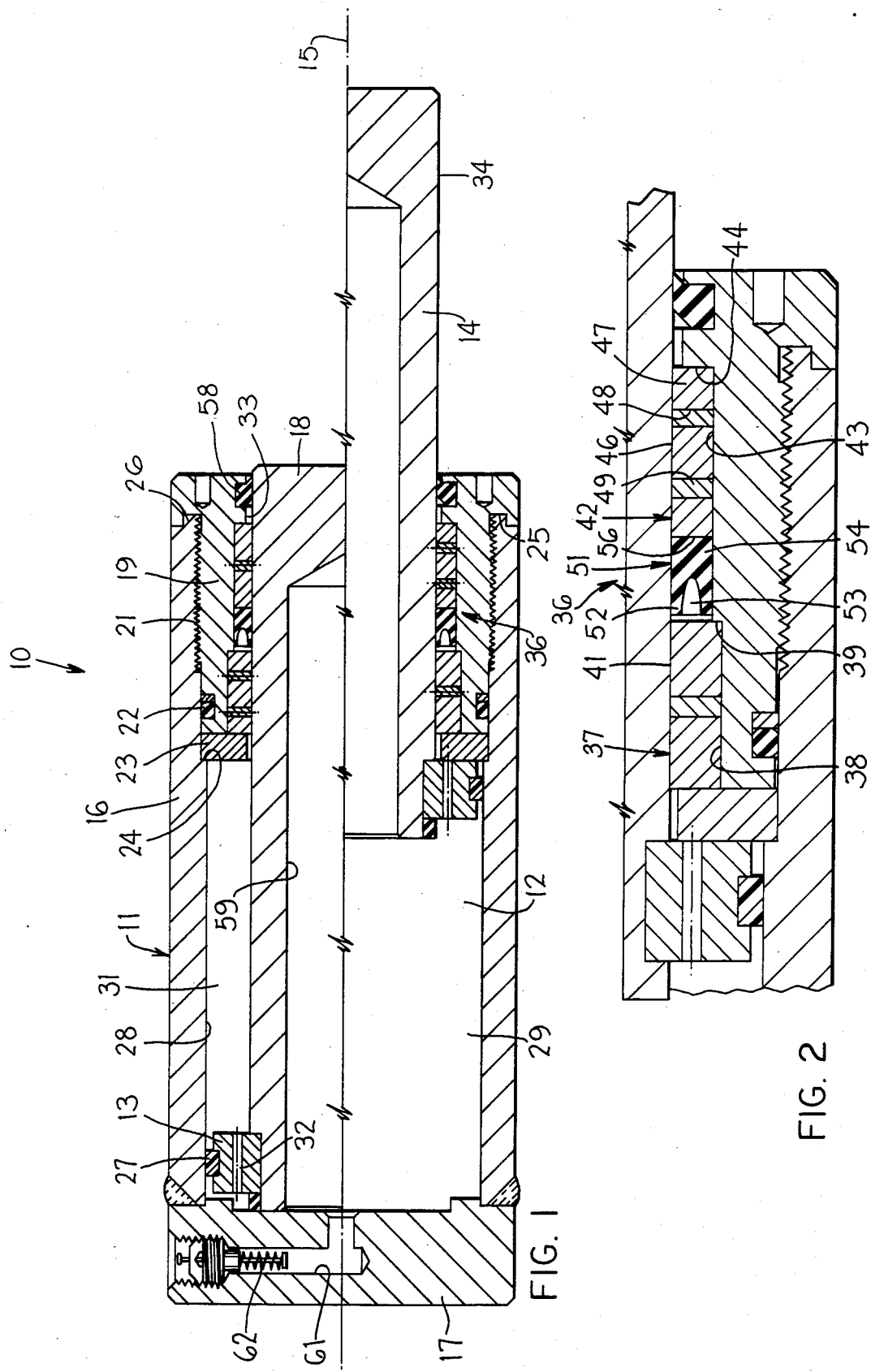
FIG. 1 is a central sectional view of the gas spring unit, the lower half illustrating the unit in the extended position assumed when a load is to be applied thereto, and the upper half illustrating the unit in its collapsed position after having had an external load imposed thereon.
FIG. 2 is an enlarged sectional view illustrating the packing structure associated with the unit.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the unit and designated parts thereof. Said terminology will include the words specifically mentioned, derivatives thereof, and words of similar import.

DETAILED DESCRIPTION

FIG. 1 illustrates a gas spring unit 10 according to the present invention. This unit includes a substantially hollow housing 11 defining therein a chamber 12. A piston 13 is disposed within the chamber 12 and is secured to the inner end of an elongated piston rod 14 which projects outwardly through one end of the housing, whereby the piston is hence supported for slidable movement along the longitudinal central axis 15 of the unit.

The housing 11 includes a main body 16 which is of a tubular or sleevelike construction. Body 16 is closed at the one end thereof by an end cap 17 which is fixed thereto, as by welding. The other end of body 16 has a further end cap 18 secured thereto. This end cap 18 includes a sleeve part 19 which is received within the end of body 16 and is rigidly joined thereto, as by a threaded connection 21. A conventional elastomeric O-ring 22 is seated in a groove formed adjacent the inner end of sleeve part 19 to create a sealed engagement with the inner wall of body 16. The inner end of sleeve part 19 is positioned closely adjacent, and effectively abuts, an annular stop ring 23 which is stationarily positioned within the body 16 in surrounding relationship to the piston rod. This stop ring 23 in turn abuts against an annular shoulder 24 formed on the body 16.

The outer end of the cap 19 has a flange portion which projects radially outwardly so as to effectively radially overlap the body 16, which flange portion has an annular undercut recess 25 formed thereon. This recess in turn accommodates therein an annular rim 26 which projects axially from the end of the body 16. In this manner, the end cap effectively surrounds the end of the sleevelike body 16 to create a hoop effect to prevent expansion of the body 16 due to the high-pressure gas contained therein.

The piston 13 is fixedly secured, such as by welding, to the inner end of the piston rod 14. The piston 13 has an annular guide ring 27 mounted thereon in surrounding relationship thereto, which guide ring is disposed in slidable engagement with the surrounding inner annular wall 28 formed on the body 16. This guide ring 27 maintains the piston ring in centered and slidably supported relationship with respect to the body 16. Guide ring 27 is preferably constructed of a glass-filled nylon to permit the piston to successfully undergo a large number of cycles.

Piston 13 divides the interior compartment 12 into a pair of chambers, namely a main pressure chamber 29 and a balancing chamber or reservoir 31. The main pressure chamber 29 is defined rearwardly (that is, leftwardly) of the piston, whereas the relief chamber 31 is defined forwardly (that is, rightwardly) of the piston and comprises the annular region between body 16 and piston rod 14, which annular region extends from the piston 13 to the stop ring 23. The piston 13 has one or more ports or orifices 32 extending axially therethrough to provide for unrestricted and continuous communication between the chambers 29 and 31 so as to balance the pressure on opposite sides of the piston.

The piston rod 14 projects outwardly of the housing through a central opening 33 formed in the end cap 19. This opening 33 has a packing structure 36 associated therewith for creating a slidable but sealed supportive engagement with the external surface 34 of the piston rod 14.

The packing structure 36, as illustrated by FIG. 2, includes a first bushing ring 37 which is stationarily seated on the annular wall 38 defined by an internal bore formed in the end cap 18, the bushing ring 37 having an extremely close fit with the wall 38. The bushing ring 37 effectively has the inner axial end thereof disposed against the stop ring 23, whereas the outer axial end is effectively seated against an annular shoulder 39 defined on the end cap. This first bushing ring 37 has an inner annular wall or bore 41 which is of only slightly larger diameter than the piston rod 14 so as to effectively slidably support the latter.

The packing structure 36 includes a second bushing ring 42 which is also stationarily seated in the end cap 18. This bushing ring 42 has the outer annular surface thereof disposed in engagement with an inner annular wall 43 defined by the internal bore of the end cap, this engagement being effectively a light press fit. Bushing ring 42 also has the outer axial end thereof disposed in abutting engagement with an annular shoulder 44 formed on the end cap. This bushing ring 42 also has an inner annular wall 46 which is only of slightly larger diameter than the rod surface 34 so as to maintain a slidable supportive engagement therewith.

Each of the bushing rings 37 and 42 are of substantially the same structure in that they each comprise a base ring member 47 which is constructed in the manner of a standard bushing, such as a bronze bushing, although more preferably of Amco bronze (bronze containing steel therein), with the base ring member having concentric inner and outer diameters and having an axial length substantially greater than the radial thickness thereof. The base ring member 47 has a plurality of small openings 48 extending radially therethrough, which openings are spaced circumferentially around the complete extent of the ring member, and each of these openings is filled with a dry lubricant, preferably graphite. Guide bushings of similar structure are known and are manufactured by Oiles Industry Co., Ltd.

The packing structure 36 also includes an elastomeric seal ring 51 which is confined within the end cap 18 axially between the bushing rings 37 and 42 for creating a slidable sealed engagement with the rod surface 34. This seal ring 51 is of the cup-type when viewed in cross section so as to have inner and outer annular lips 52 separated by an annular groove 53, which groove opens inwardly for communication with the chamber 31. This seal ring has the base end 54 thereof disposed so as to abut against the inner axial end 56 of the outer bushing ring 42. The other end of the seal ring, namely the end defined by the annular lips 52, is normally maintained in small axially spaced relationship from the inner bushing ring 37 so that the latter is prevented from axially compressing the seal ring.

There is also preferably provided a lip seal 58 which is secured within the end cap 18 and creates a slidable engagement with the rod surface 34. This lip seal 58 is disposed axially outwardly from the packing 34 and is provided primarily for preventing contaminants on the piston rod from entering into the gas spring unit.

The piston rod 14 is preferably provided with an enlarged bore or opening 59 extending over a majority of the length thereof, which bore opens through the inner end thereof for open communication with the main pressure chamber 29, whereby this bore 59 in effect comprises a part of the main pressure chamber 29 so as to increase the volume of the chamber and hence the volume of the high-pressure gas stored therein.

The rear end cap 17 has, in the illustrated embodiment, a passage 61 therethrough for communication with the main pressure chamber 29. This passage 61, in the illustrated embodiment, has a spring-urged check valve 62 associated therewith and normally maintained in a closed position for preventing escape of gas from the spring unit. This check valve 62 enables the spring unit to be charged, or recharged when necessary, with high-pressure gas, preferably nitrogen. If desired, the passage 61 can be connected via a suitable conduit to an external surge tank, which surge tank can be of greater volume and can maintain therein a quantity of high-pressure gas. A check valve 62 would again be provided, either on the spring unit or associated with the conduit connected between the spring unit and the surge tank, so as to permit the main chamber 29 in the spring unit to be automatically replenished if the pressure therein falls below a predetermined magnitude. By using an external surge tank, a single surge tank can be connected to a plurality of spring units so as to ensure that a proper minimum pressure is maintained in the spring units at all times.

The check valve 62 is, in the illustrated embodiment, of a conventional structure substantially corresponding to a tire-stem valve. However, numerous other check valve constructions could be utilized, if desired.

OPERATION

While the operation of the gas spring unit is believed obvious from the description set forth above, nevertheless same will be briefly described to ensure a complete understanding thereof.

The gas spring unit 10 is initially charged with gas, particularly nitrogen, so that the gas pressure in the chambers 29 and 31 is at the same high level, such as approximately 2,000 to 3,000 psi. When in the charged condition, and when not subjected to an external load, the pressure of the gas in main pressure chamber 29 acts against a greater piston area than the gas in the chamber 31, and hence the piston rod assembly 13-14 automatically moves outwardly (rightwardly) until the piston abuts the stop ring 23. Hence, the pressurized gas spring unit is normally maintained in the position wherein the piston rod 14 is fully extended, as illustrated by the lower half of FIG. 1.

When an external load, such as a shock force, is imposed axially against the exposed end of the piston rod 14, the piston rod assembly 13-14 collapses inwardly (leftwardly) into the housing 11. This effects a reduction in the combined volume of the chambers 29 and 31, and causes a compression of the gas within the chambers and hence an increase in the gas pressure. The orifices 32 permit the pressure gas to flow into the balancing chamber 31 so as to equalize the pressure in chambers 29 and 31. This hence causes the unbalanced gas pressure to act only on an area equal to that defined by the outer diameter of rod 14, thereby preventing creation of an undesirably large cushioning force. In this manner, the spring unit is able to absorb and cushion the external load or shock force which is imposed on the piston rod and hence effects compression of the piston rod into the housing.

The piston rod assembly 13-14 will remain in the collapsed position illustrated by the upper half of FIG. 1 until the external load is removed. Thereafter, the pressurized gas within the main pressure chamber 29, since it acts against a bigger piston area than the gas within the chamber 31, causes the piston rod assembly 13-14 to automatically move leftwardly until the piston rod is again fully extended, and is ready to have an additional shock load imposed thereon.

During the cyclic operation of the spring unit, namely the cyclic movement of the piston rod 14, the spaced bushing rings 37 and 42 slidably support the piston rod. Further, the graphite 49 associated with the bushing rings provide for limited lubrication between the piston rod and the bushing rings so that the latter will undergo very little wear, and hence will maintain a close but free slidable engagement with the piston rod so as to permit the spring unit to operate over a large number of cycles. In addition, some of the graphite will contact the rod surface 34 at locations disposed on axially opposite sides of the annular sealing ring 51, and this graphite will be carried into contact with the inner annular lip 52 of the seal ring so as to also provide at least minimal lubrication between the piston rod and the inner lip of the sealing ring 51. This minimal lubrication is sufficient to substantially minimize wear of the sealing ring, whereupon the sealing ring permits the spring unit to undergo a large number of operational cycles, while at the same time not interfere with the desirable sealed relationship created between the sealing ring and the piston rod.

The sealing ring 51 is preferably constructed of polyurethane since this provides the sealing ring with a limited amount of elasticity so as to create the desired sealed engagement with the piston rod, while at the same time the sealing ring still possesses substantial stiffness and strength so as to not undergo any undesired deformation due to its exposure to the high-pressure gas contained within the spring unit.

The gas spring unit of this invention, substantially as illustrated by the drawings, has already been experimentally tested with a precharge internal pressure therein of 2,000 psi (which precharge pressure exists when the spring unit is in the extended position), and this experimental spring unit has been subjected to 1,000,000 cycles of operation. The experimental unit was observed to successfully operate in the desired manner throughout the 1,000,000 test cycles, and was not observed to experience any significant leakage of gas or to experience any significant wear of the packing structure.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gas spring unit having a housing, a piston rod means slidably supported within said housing and projecting outwardly thereof, the piston rod means being slidably movable relative to the housing between a first position wherein the rod means extends outwardly of the housing through a substantial extent and a second position wherein the rod means is substantially telescoped within the housing, the housing and the rod means cooperating to define a pressure chamber therebetween, a quantity of high-pressure gas contained within said pressure chamber, said gas being at a high pressure level when the piston rod means is in said first position, and a packing structure coacting between said housing and said piston rod means for creating a slidable sealed engagement therebetween, the improvement comprising:

a first bushing ring stationarily mounted on said housing in surrounding relationship to said piston rod means and having an inner annular surface disposed for slidably and guidably supporting the piston rod means, said first bushing ring having an outer axially directed end surface which abuts against a shoulder formed on said housing;

a second bushing ring stationarily mounted on said housing in surrounding relationship to said piston rod means for slidably and guidably supporting said rod means, said second bushing ring being spaced axially from said first bushing ring and disposed so as to be axially outermost relative to the projecting end of said piston rod means;

each of said bushings rings having lubricating means associated therewith for effecting lubrication of the slidable contact area between the respective bushing ring and the piston rod means;

each bushing ring being of a substantially rectangular cross secrion and having a radial thickness which is substantially less than its axial length, each bushing ring having opening means formed therein and communicating with the slidable area of engagement between the respective bushing ring and the piston rod means, said lubricating means comprising dry lubricant disposed within and substantially filling said opening means; and a cup-type sealing ring stationarily mounted on said housing in surrounding relationship to said piston rod means, said sealing ring being disposed axially between said first and second bushing rings and having an annular lip which projects axially inwardly and is maintained in slidable sealed engagement with the piston rod means, said sealing ring having an inner axial end thereof positioned closely adjacent but spaced axially a small distance from the outer axial end surface of said first bushing ring, said sealing ring having its outer axial end surface disposed in abutting engagement with an inner axially directed end surface formed on said second bushing ring.

2. A spring unit according to claim 1, wherein said sealing ring is of a polyurethane material.

3. A spring unit according to claim 1, wherein said housing includes a main sleevelike body which is formed by an elongate one-piece tubular member which is closed at one end by means of a first end cap permanently fixed thereto and is closed at the other end by means of a second end cap which is removably fixedly attached thereto, said second end cap defining an opening therethrough through which projects said piston rod means, said second end cap including an axially elongated sleeve part which projects into and is removably fixedly joined to said sleevelike body, said sleeve part having said packing structure mounted thereon.

4. A spring unit according to claim 1, wherein said bushing rings are primarily of bronze, and said dry lubricant is graphite.

5. A gas spring unit, comprising:

housing means including a tubular sidewall having a first end cap fixed to one end thereof for closing off said one end, and a second end cap removably fixed to the other end thereof, said second end cap having an opening extending therethrough in alignment with the longitudinal centerline of said tubular body;

piston means slidably supported in said housing means for slidable movement along said longitudinal axis between extended and contracted positions, said piston means including an elongated piston rod which has a piston fixed to an inner end thereof and slidably supported within said housing means, said piston rod projecting outwardly through the opening formed in said second end cap;

said housing means and said piston means cooperating to define therebetween a main pressure chamber, said main pressure chamber being defined at least in part by axially opposed end walls defined on said piston means and said first end cap;

said piston means and said housing means cooperating to define a balancing pressure chamber, said balancing chamber being defined radially between said piston rod and said tubular body and disposed on the opposite axial side of said piston means from said main pressure chamber;

means defining an unrestricted flow opening between said main and balancing chambers for permitting unrestricted flow therebetween;

a packing structure including first and second bushing rings stationarily mounted on said second end cap in axially spaced relationship, each of said bushing rings being disposed in surrounding and slidable guiding relationship to said piston rod, each of said bushing rings having lubricating means carried thereby and disposed for contact with the piston rod;

said first bushing ring being positioned axially innermost relative to said second bushing ring and being axially separated therefrom by an intermediate axial space, said first bushing ring having an outer axially directed end surface disposed in abutting engagement with a first annular shoulder formed on said second end cap, and said second bushing ring having an outer axially directed end surface disposed in abutting engagement with a second annular shoulder formed on said second end cap; said packing structure also including an annular sealing ring mounted on said second end cap and disposed in the axial space between said first and second bushing rings, said sealing ring being of a stiff elastomeric material and having an inner annular lip which projects axially toward said piston and is maintained in surrounding and slidable engagement with said piston rod, said sealing ring having an outer axial end thereof disposed in abutting engagement with an inner axially directed end surface on said second bushing ring, whereby the seating of said first and second bushing rings on the respective first and second annular shoulders prevents the bushing rings from axially moving relatively toward one another so as to avoid compression of the sealing ring therebetween.

6. A spring unit according to claim 5, said sealing ring having an inner axial end thereof maintained in slight axially spaced relationship from said first bushing ring.

7. A spring unit according to claim 5, wherein each of said bushing rings has a plurality of openings formed radially therethrough in circumferentially spaced relationship therearound, said lubricating means including a quantity of dry graphite positioned within and filling each of said openings.

8. A spring unit according to claim 5, wherein said second end cap has an axially elongated sleeve part which projects into said other end of said tubular body and is threadably coupled thereto, said sleeve part defining said opening therethrough, said sleeve part defining said first and second annular shoulders thereon, said second end cap having an annular flange at the axially outer end of said sleeve part and projecting radially outwardly beyond said other end of said tubular body, said flange having an undercut annular groove formed on the underside thereof for accommodating therein the free end of said tubular body, said flange having an outer annular rim part which axially overlaps and externally reinforcingly surrounds said tubular body at said other end thereof.

9. A spring unit according to claim 5, wherein said tubular sidewall comprises an elongated one-piece member having said first end cap permanently fixed to said one end thereof and said second end cap removably fixed to the other end thereof by means of a threaded connection therebetween.

* * * * *